No. 812,547. PATENTED FEB. 13, 1906.
G. F. COOK.
BICYCLE SUPPORT.
APPLICATION FILED MAY 31, 1905.
2 SHEETS—SHEET 1.
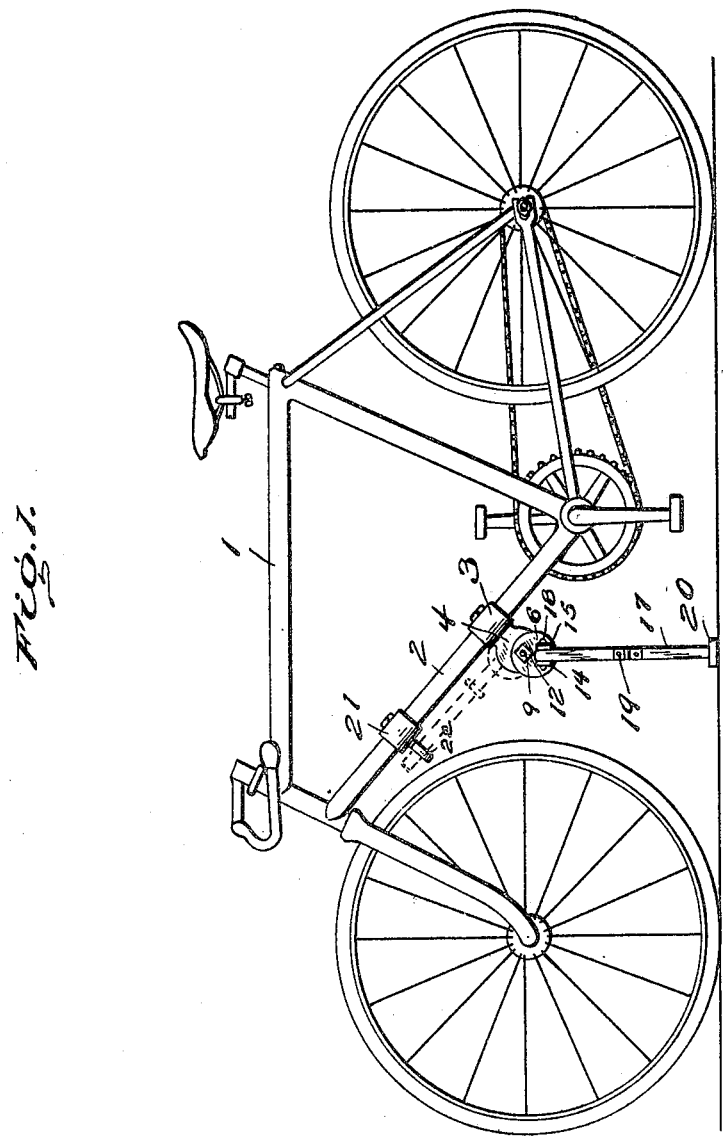
Witnesses
S. R. Thomas
E. M. Dolford
Inventor
G. F. Cook
By Chandler & Chandler
Attorneys

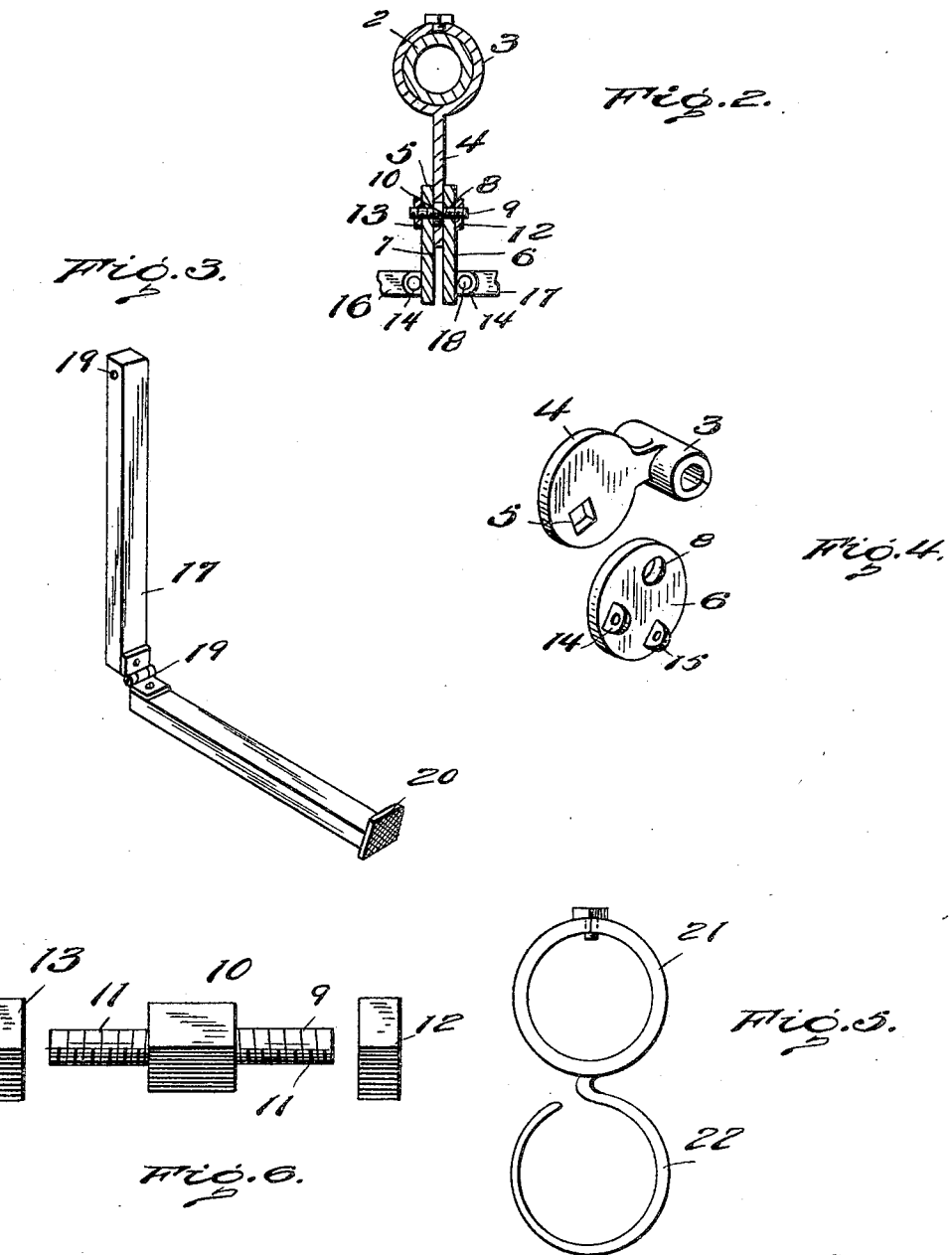

UNITED STATES PATENT OFFICE.

GEORGE F. COOK, OF EAST WASHINGTON, NEW HAMPSHIRE.

BICYCLE-SUPPORT.

No. 812,547.     Specification of Letters Patent.     Patented Feb. 13, 1906.

Application filed May 31, 1905. Serial No. 263,107.

*To all whom it may concern:*

Be it known that I, GEORGE F. COOK, a citizen of the United States, residing at East Washington, in the county of Sullivan, State of New Hampshire, have invented certain new and useful Improvements in Bicycle-Supports; and I do hereby declare the following to be a full, clear, and exact description of the invention, such as will enable others skilled in the art to which it appertains to make and use the same.

This invention relates to bicycle-supports.

One object of the invention is to provide a simple, inexpensive, durable, and efficient means for supporting bicycles without engaging the latter in racks or against walls.

Another object of the invention resides in the provision of a support for bicycles of a foldable nature and attaching to the bicycle-frame in such manner that it may be carried by the latter for use at any time.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the present invention.

In the drawings, Figure 1 is a side elevation of a portion of a bicycle, illustrating my support in operation, the dotted lines showing the same folded and engaged with the frame out of contact with the ground. Fig. 2 is a section taken transversely through the bottom bar of the bicycle-frame and including the attaching-clamp and parts directly connected thereto. Fig. 3 is a detail view of one of the supporting-legs. Fig. 4 is a detail view of the leg-supporting clamps. Fig. 5 is a detail view of the clamp for holding the free ends of the supporting-clamp out of contact with the ground. Fig. 6 is a detail view of the pin for supporting the disks.

Referring now more particularly to the accompanying drawings, the reference character 1 designates a portion of an ordinary bicycle-frame, secured to the lower main tube or bottom bar 2 of which, in any suitable manner, is a clamp 3, having an ear 4 projecting therefrom and beneath the said tube, the ear 4 having a rectangular-shaped opening 5 therein and arranged slightly beneath the center thereof.

Disposed upon adjacent faces of the ear 4 are two plates or disks 6 and 7, each having a circular opening 8 arranged off from the center thereof, there being a bolt or the like 9 having a rectangular enlargement 10 intermediate its ends for engagement in the rectangular opening 5 in the ear 4, the round portion 11 upon opposite sides of the enlargement fitting in the circular openings 8 of the plates or disks 6 and 7. It will be understood that the bolt does not turn, by reason of its peculiar engagement within the aforesaid opening of the ear 4, but that the plates or disks 6 and 7 do turn upon the said bolt. The bolt 11 has a nut 12 at one end and its opposite end screw-threaded for the reception of the nut 13.

Each plate or disk 6 and 7 is provided upon its outer face with a pair of perforated ears 14 and 15, respectively, between which is fitted one end of each of the supporting-legs 16 and 17, there being a pin or bolt 18 passed through said perforated ears and the end of the corresponding leg, the latter each having a perforation 19 designed to aline with the perforations of the said ears for the reception of the pin or bolt 18 just alluded to. These supporting-legs are secured fixedly to the pin or bolt 18, which latter is also held against movement in the said ears. The plates or disks 6 and 7, however, are permitted to turn upon their pivot-bolt. The legs 16 and 17 are each provided with a break-hinge 19 intermediate its ends to permit of folding of the legs, there being a foot 20 carried at the free ends of the legs for engagement with the ground to support the bicycle when desired.

Secured to the lower frame-tube 2 in advance of the clamp 3 is another clamp 21, having a spring-finger 22 extending outwardly therefrom for the reception of the outer ends of the supporting-legs 16 and 17 when not in use, it being understood that the legs are folded at their hinged intermediate portions and then disposed in their seat formed by the spring-finger 21, the loose mounting of the plates or disks 6 and 7 upon the pin 9 permitting of rotation of the former upon the latter.

What is claimed is—

1. In a bicycle-support, a frame, a clamp secured to the frame and provided with an ear having a rectangular-shaped opening, a pin having an intermediate rectangular portion for engagement in said opening to prevent rotation of the pin, a disk mounted upon each end of the pin adjacent the said ear, each disk having a circular opening for engagement with a circular portion of said pin to permit of rotation of the disks, a leg connected to each disk for engagement with the ground to support the bicycle, and means for holding the free ends of the said legs out of contact with the ground.

2. In a bicycle-support, a frame, a clamp secured to the frame and provided with an ear having a rectangular-shaped opening therein, a pin having a rectangular intermediate portion for engagement in said opening to prevent rotation of said pin, a disk mounted for rotation upon the pin adjacent each side of the said ear, each disk having ears secured upon its outer face, a supporting-leg secured to the ears of each disk, said supporting-legs each being of sections hingedly connected together, and means upon the frame for receiving the free ends of the supporting-legs when not in supporting position.

In testimony whereof I affix my signature in presence of two witnesses.

GEORGE F. COOK.

Witnesses:
AIDEN W. VICKERY,
FRANK M. PEASLEY.